(12) United States Patent
Breslow (10) Patent No.: US 11,138,015 B2
(45) Date of Patent: Oct. 5, 2021

(54) SPATIAL PIPELINING OF SOFTWARE REDUCTIONS AND SCANS

(71) Applicant: ADVANCED MICRO DEVICES, INC., Santa Clara, CA (US)

(72) Inventor: Alexander Dodd Breslow, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 99 days.

(21) Appl. No.: 16/565,819

(22) Filed: Sep. 10, 2019

(65) Prior Publication Data

US 2021/0072999 A1 Mar. 11, 2021

(51) Int. Cl.
  *G06F 9/38* (2018.01)
  *G06F 9/30* (2018.01)
(52) U.S. Cl.
  CPC ........ *G06F 9/3887* (2013.01); *G06F 9/30036* (2013.01); *G06F 9/3867* (2013.01)
(58) Field of Classification Search
  CPC .. G06F 9/3887; G06F 9/3867; G06F 9/30036; G06F 9/3001; G06F 9/30032
  See application file for complete search history.

(56) References Cited

U.S. PATENT DOCUMENTS

| | | | |
|---|---|---|---|
| 7,716,250 B1* | 5/2010 | Manasse | G06F 16/9027 707/797 |
| 2004/0225706 A1 | 11/2004 | Harris | |
| 2005/0125476 A1* | 6/2005 | Symes | G06F 9/30109 708/524 |
| 2010/0333108 A1* | 12/2010 | Cypher | G06F 8/452 718/106 |
| 2018/0276784 A1* | 9/2018 | Varadarajan | G06T 1/20 |
| 2019/0384613 A1* | 12/2019 | Petit | G06T 1/20 |

OTHER PUBLICATIONS

Blelloch, Guy E., "Prefix Sums and Their Applications", School of Computer Science, Carnegie Mellon University, Nov. 1990, 26 pages.

* cited by examiner

*Primary Examiner* — Farley Abad (57) ABSTRACT

A compute unit includes single-instruction-multiple-data (SIMD) lanes that implement a pipeline. The compute unit also includes a scheduler to schedule the SIMD lanes to apply a binary associative operation to pairs of elements associated with ordered sets of elements. Subsets of the SIMD lanes concurrently apply the binary associative operation to pairs of elements at different levels of upsweep trees associated with the ordered sets of elements. Application of the binary associative operation is used to perform a reduction operation or a scan operation on the ordered sets of elements. In the case of a scan operation, the scheduler schedules the SIMD lanes to concurrently apply the binary associative operation to pairs of elements at different levels of downsweep trees associated with the ordered sets of elements subsequent to applying the binary associative operation at different levels of the upsweep trees.

20 Claims, 11 Drawing Sheets

SPATIAL PIPELINING OF SOFTWARE REDUCTIONS AND SCANS

BACKGROUND

Reduction and scan operations apply a binary associative operation sequentially to an ordered set of elements. For example, a reduction operation applies a binary associative operation $\oplus$ to the ordered set of n elements:

$$[a_0, a_1, \ldots a_{n-1}]$$

to produce a scalar result:

$$a_0 \oplus a_1 \oplus \ldots \oplus a_{n-1}$$

For another example, an inclusive scan operation sequentially applies the binary associative operation $\oplus$ to the ordered set of n elements to produce a vector result:

$$[a_0, (a_0 \oplus a_1), \ldots, (a_0 \oplus a_1 \oplus \ldots \oplus a_{n-1})]$$

An exclusive scan operation produces a similar result except that the first element in the vector result is zero. The inclusive or exclusive scan operations are referred to as prefix sums when the binary associative operation is addition. Scans and reductions are common single-instruction-multiple-data (SIMD) operations that are found in virtually every piece of code executing in processing units such as graphics processing units (GPUs). Examples of code that employ scans and reductions include lexical analysis of strings of characters, addition of multi-precision numbers, evaluation of polynomials, solving recurrences, sorting algorithms, tree operations, and the like. Conventional algorithms for performing prefix sum operations include Kogge-Stone, Brent-Kung, and Blelloch's upsweep/downsweep algorithm. However, the traditional techniques for performing prefix sums are not optimized for efficiently computing multiple scans in parallel. Instead, they focus on efficiently computing a single scan at a time but at the cost of performance and efficiency pitfalls on SIMD hardware platforms. For example, Kogge-Stone achieves a minimum tree depth by performing redundant computations.

For another example, the upsweep and downsweep stages of Blelloch's algorithm leave a large number of SIMD lanes idle, which leads to a poor average parallelism.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

The number of iterations required to perform reduction operations on ordered sets of elements at a processing unit is reduced by pipelining the reduction operations so that different subsets of lanes in a processing unit concurrently apply a binary associative operation to pairs of elements at different levels of upsweep (and downsweep, in the case of a scan operation) trees for the ordered sets of elements. A number of stages in the pipeline is determined by the number of levels in the upsweep tree and each pipeline stage is associated with a different level of the upsweep tree and downsweep tree, in the case of a scan operation. During each iteration of the pipeline, each pipeline stage concurrently applies the binary associative operation to pairs of elements associated with different ordered sets of elements at different levels of the upsweep tree. After a pipeline iteration is complete, the results of the binary operations performed by the pipeline stages are provided to the pipeline stages associated with next higher levels of the upsweep tree. In some embodiments, data is exchanged between the pipeline stages using caches, scratch pads implemented in high-bandwidth/low-latency memory, or lane interchange logic implemented using vector registers and vector load/store instructions. Results of binary operations performed in the last pipeline stage are written to corresponding registers, buffers, or memory. Scan operations are performed on ordered sets of elements by pipelining the binary associative operations for the upsweep and subsequently pipelining the binary associative operations and data movement for the downsweep based on a corresponding downsweep tree.

In some embodiments, the lanes of the processing unit are assigned to the levels of the upsweep (and downsweep, in the case of a scan operation) trees based on a number of elements in the ordered sets of elements and the number of lanes in the processing unit. The number of lanes assigned to each level is double the number of lanes in the adjacent lower level (except for the lowest level) and half the number of lanes in the adjacent higher level except for the highest level, which is assigned a single lane. For example, in the case of a scan operation, a 64 lane processing unit concurrently performs the binary associative operation on elements in ordered sets of 64 elements using six layers or stages. Lanes 0-31 perform the binary associative operation on 32 pairs of elements associated with first ordered set, lanes 32-47 perform the binary associative operation on 16 pairs of elements associated with a second ordered set, lanes 48-55 perform the binary associative operation on eight pairs of elements associated with a third ordered set, lanes 56-59 perform the binary associative operation on four pairs of elements associated with a fourth ordered set, lanes 60 and 61 perform the binary associative operation on two pairs of elements associated with a fifth ordered set, and lane 62 performs the binary associative operation on a pair of elements associated with a sixth ordered set. In cases where less than all the lanes are used, e.g., pipeline filling and pipeline draining, a mask is used to identify the inactive lanes.

As used herein, the term "reduction" refers to application of an associative operator such as (+, *, MIN, MAX) to a list or ordered set of elements. In some embodiments, the elements in the ordered set are represented as a 32-bit integer, a 64-bit integer, or a floating point data type. A reduction is performed by applying the reduction operator pairwise over all inputs until a result is achieved. Accumulation is one form of reduction. In accumulation, elements in an ordered set are added together to form a single scalar output. For example, if the ordered set is stored as an array of 32-bit integers with the values 1 to 100, then the result of the accumulation would be their collective sum, or (100)(101)/2 (from Gauss's formula). Typically, reductions are implemented as trees such as upsweep trees. In the case of tree-based accumulation, pairs of elements are first added together, then those results are added, and so forth until only the total accumulated value remains. For example, the ordered set of elements [1 2 3 4 5 6 7 8] is added together first as (1+2) (3+4) (5+6) (7+8), then (3+7) (11+15), and then (10+26) to yield a reduction value of 36. As another example, MAX would be applied as follows: MAX(1, 2), MAX(3,4), MAX(5,6), MAX(7,8) at a first level of the tree, MAX(2,4) and MAX(6, 8) at a second level of the tree, and MAX(4, 8) at the last level of the tree to yield 8.

As used herein, the term "scan" refers to application of an associative operator to an ordered set of elements. A scan differs from a reduction because the result of the scan is another list rather than a single reduced value. When the operator is addition, a scan is called a prefix sum. Scans and prefix sums have two variants: inclusive and exclusive. In an inclusive prefix sum, the value of the i-th element in the output is the sum of all elements in the input with indices less than or equal to i. In the exclusive case, the value of the i-th element in the output is all elements in the input with indices less than i. For instance, the inclusive prefix sum of the ordered set [1 2 3 4] is a set [1 3 6 10], whereas the exclusive prefix sum of the ordered set [1 2 3 4] is a set [0 1 3 6].

Figure 1:
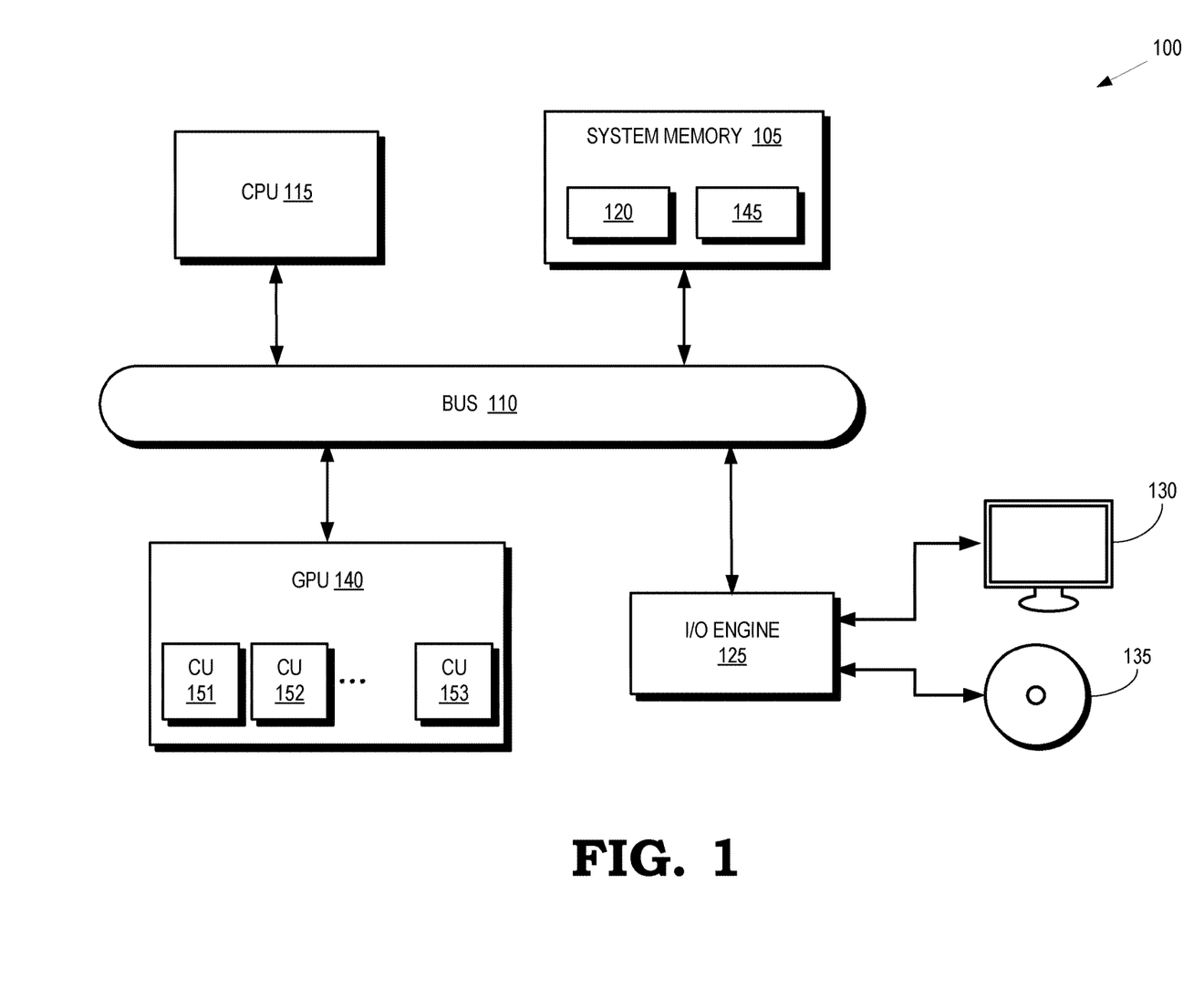
FIG. 1 is a block diagram of a processing system that provides spatial pipelining of software reductions and scans according to some embodiments.

FIG. 1 is a block diagram of a processing system 100 that provides spatial pipelining of software reductions and scans according to some embodiments. The processing system 100 includes or has access to a system memory 105 or other storage component that is implemented using a non-transitory computer readable medium such as a dynamic random access memory (DRAM). However, some embodiments of the memory 105 are implemented using other types of memory including static random access memory (SRAM), nonvolatile RAM, and the like. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes a central processing unit (CPU) 115. Some embodiments of the CPU 115 include multiple processing elements (not shown in FIG. 1 in the interest of clarity) that execute instructions concurrently or in parallel. The processing elements are referred to as processor cores, compute units, or using other terms. The CPU 115 is connected to the bus 110 and therefore communicates with the memory 105 via the bus 110. The CPU 115 executes instructions such as program code 120 stored in the memory 105, and the CPU 115 stores information in the memory 105 such as the results of the executed instructions. The CPU 115 is also able to initiate graphics processing by issuing draw calls.

An input/output (I/O) engine 125 handles input or output operations associated with a display 130, as well as other elements of the processing system 100 such as keyboards, mice, printers, external disks, and the like. The I/O engine 125 is coupled to the bus 110 so that the I/O engine 125 communicates with the memory 105, the CPU 115, or other entities that are connected to the bus 110. In the illustrated embodiment, the I/O engine 125 reads information stored on an external storage component 135, which is implemented using a non-transitory computer readable medium such as a compact disk (CD), a digital video disc (DVD), and the like. The I/O engine 125 also writes information to the external storage component 135, such as the results of processing by the CPU 115.

The processing system 100 includes a graphics processing unit (GPU) 140 that renders images for presentation on the display 130. For example, the GPU 140 renders objects to produce values of pixels that are provided to the display 130, which uses the pixel values to display an image that represents the rendered objects. Some embodiments of the GPU 140 are used for general purpose computing and perform reduction and scan operations on ordered sets of elements, among other operations. In the illustrated embodiment, the GPU 140 communicates with the memory 105 (and other entities that are connected to the bus 110) over the bus 110. However, some embodiments of the GPU 140 communicate with the memory 105 over a direct connection or via other buses, bridges, switches, routers, and the like. The GPU 140 executes instructions stored in the memory 105 and the GPU 140 stores information in the memory 105 such as the results of the executed instructions. For example, the memory 105 stores a copy 145 of instructions that represent a program code that is to be executed by the GPU 140.

The GPU 140 includes one or more compute units 151, 152, 153, which are collectively referred to herein as "the compute units 151-153." The compute units 151-153 include multiple single-instruction-multiple-data (SIMD) lanes (not shown in FIG. 1 in the interest of clarity), which are used to implement a pipeline for concurrently performing reduction or scan operations on multiple sets of ordered elements. The SIMD lanes apply a binary associative operation to pairs of elements associated with the ordered sets of elements. As discussed herein, reduction operations use upsweep trees to compute the reduction of the ordered set of elements to a scalar result. Scan operations use both upsweep trees and downsweep trees to compute vector results including a sequence of values that represent ordered combinations of the elements. To perform a reduction or scan operation, subsets of the SIMD lanes concurrently apply the binary associative operation to pairs of elements at different levels of upsweep trees associated with the ordered sets of elements. In the case of a scan operation, the SIMD lanes concurrently apply the binary associative operation to pairs of elements at different levels of downsweep trees associated with the ordered sets of elements subsequent to applying the binary associative operation at different levels of the upsweep trees.

Figure 2:
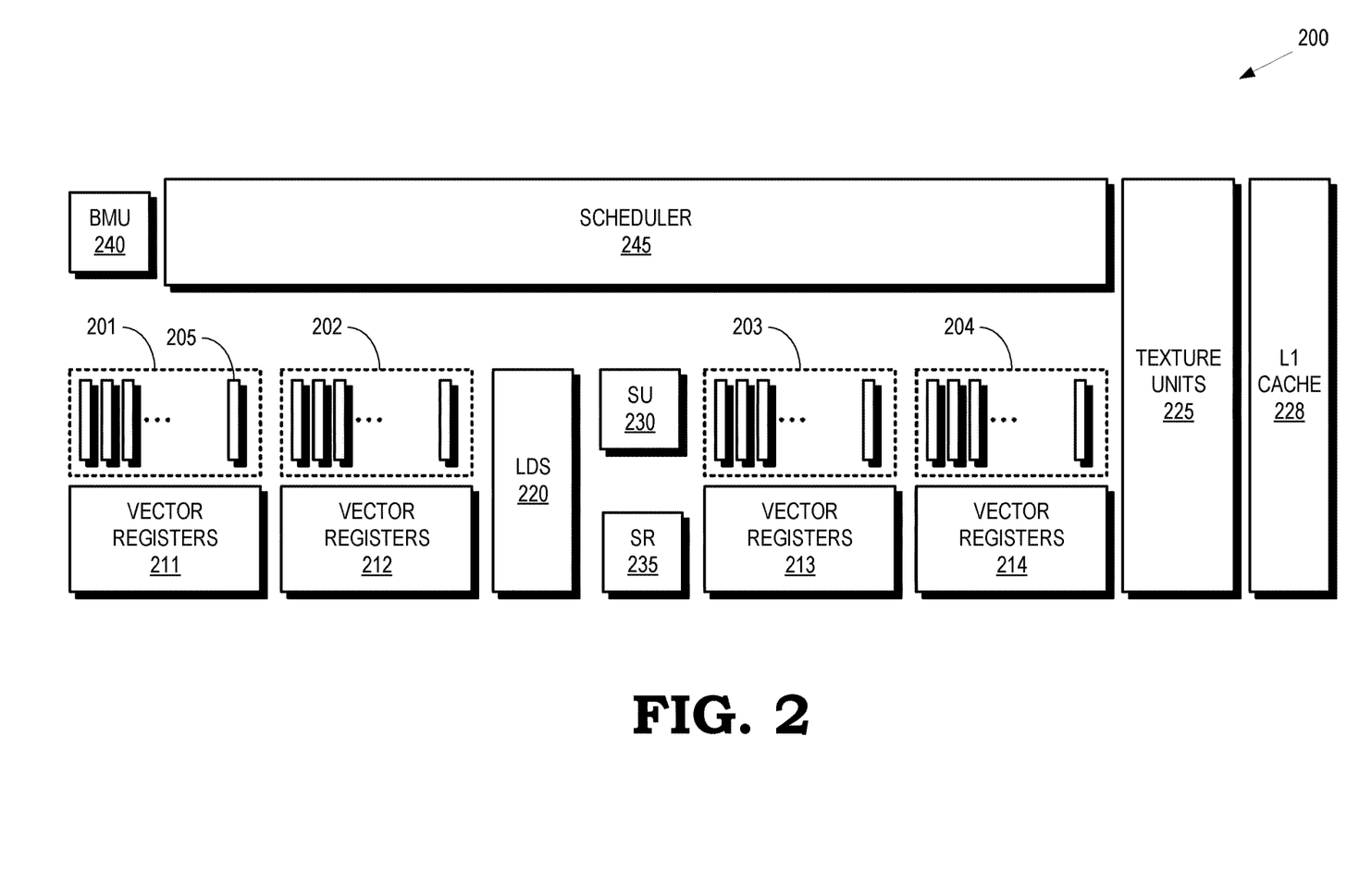
FIG. 2 is a block diagram of a compute unit according to some embodiments.

FIG. 2 is a block diagram of a compute unit 200 according to some embodiments. The compute unit 200 is used to implement some embodiments of the compute units 151-153 shown in FIG. 1. The compute unit 200 includes sets 201, 202, 203, 204 (collectively referred to herein as "the sets 201-204") of SIMD lanes 205, only one indicated by a reference numeral in the interest of clarity. The SIMD lanes 205 in the sets 201-204 perform or execute operations concurrently or in parallel. In some embodiments, each of the sets 201-204 includes sixteen SIMD lanes 205 so that the number of available SIMD lanes 205, or the "width" of the compute unit 200, is 64. The sets 201-204 are associated with corresponding vector registers 211, 212, 213, 214, which are collectively referred to herein as "the vector registers 211-214." The vector registers 211-214 store data that is provided to the corresponding sets 201-204. The vector registers 211-214 also store results of operations performed by the SIMD lanes 205 in the corresponding sets 201-204. Some embodiments of the vector registers 211-214 are implemented as vector general-purpose registers (VGPRs).

The compute unit 200 includes a local data store (LDS) 220 that stores data in a location that is accessible to the SIMD lanes 205 in all the sets 201-204. In some embodiments, the LDS 220 is part of lane interchange circuitry that is used to transfer data between the sets 201-204, e.g., by moving data among the vector registers 211-214. The compute unit 200 also includes texture units 225. The texture units 225 include one or more texture filter units and load/store units that perform texture fetching. In some embodiments, the texture units 225 are part of the lane interchange circuitry. The compute unit 200 further includes a cache such as an L1 cache 228 that caches data that is frequently used by the SIMD lanes 205 in the sets 201-204. The L1 cache 228 is part of a cache hierarchy implemented in a GPU such as the GPU 140 shown in FIG. 1. In some embodiments, the L1 cache 228 is part of the lane interchange circuitry.

The compute unit 200 includes a scalar unit (SU) 230 and a corresponding scalar register 235. The SU 230 performs scalar operations, e.g., using information stored in the scalar register 235. The results of the scalar operations are written back to the scalar register 235. The compute unit 200 also includes a branch/message unit (BMU) 240 and a scheduler 245 that schedules operations for execution on the SIMD lanes 205 of the sets 201-204.

Some embodiments of the compute unit 200 include lane interchange circuitry that supports reduction operations and scan operations by loading data into the vector registers 211-214 and for communicating data between the SIMD lanes 205 in the sets 201-204. Data is loaded into the vector registers 211-214 using vector load instructions. The state of the vector registers 211-214 is stored using vector store instructions. Moving data between lanes in the sets 201-204 is performed via lane interchange circuitry. In some embodiments, the lane interchange circuitry includes one or more of the LDS 220, the texture units 225, and the L1 cache 228. Some embodiments of the compute unit 200 support hardware instructions for broadcasting a value of a SIMD lane 205 to one or more other SIMD lanes in the compute unit 200. Some embodiments of the compute unit 200 also support instructions and associated logic for shifting or permuting the assignment of values to the SIMD lanes 205 in the sets 201-204. These instructions are referred to as vector swizzle or permute instructions.

In some embodiments, permutation is performed and lane interchange circuitry is not present or exposed as an instruction. In these cases, a hardware scratchpad or cache is leveraged to write intermediate results. After a reduction or scan stage of the pipeline is completed, the intermediate results are written back from the vector registers 211-214 to the staging location (e.g., scratchpad or cache). The contents of the vector registers 211-214 are subsequently updated by selectively loading from the staging location. In some embodiments, the lane interchange circuitry is implemented as part of the controller for the cache or scratch pad. In other embodiments, the reduction or scan is performed directly in cache or scratchpad memory. Hardware scratchpads in some embodiments of the compute unit 200 offer high-bandwidth low-latency memory that is accessed in a non-coalesced fashion with high throughput. This is in contrast to a frame buffer where irregular accesses often lead to much worse throughput.

Figure 3:
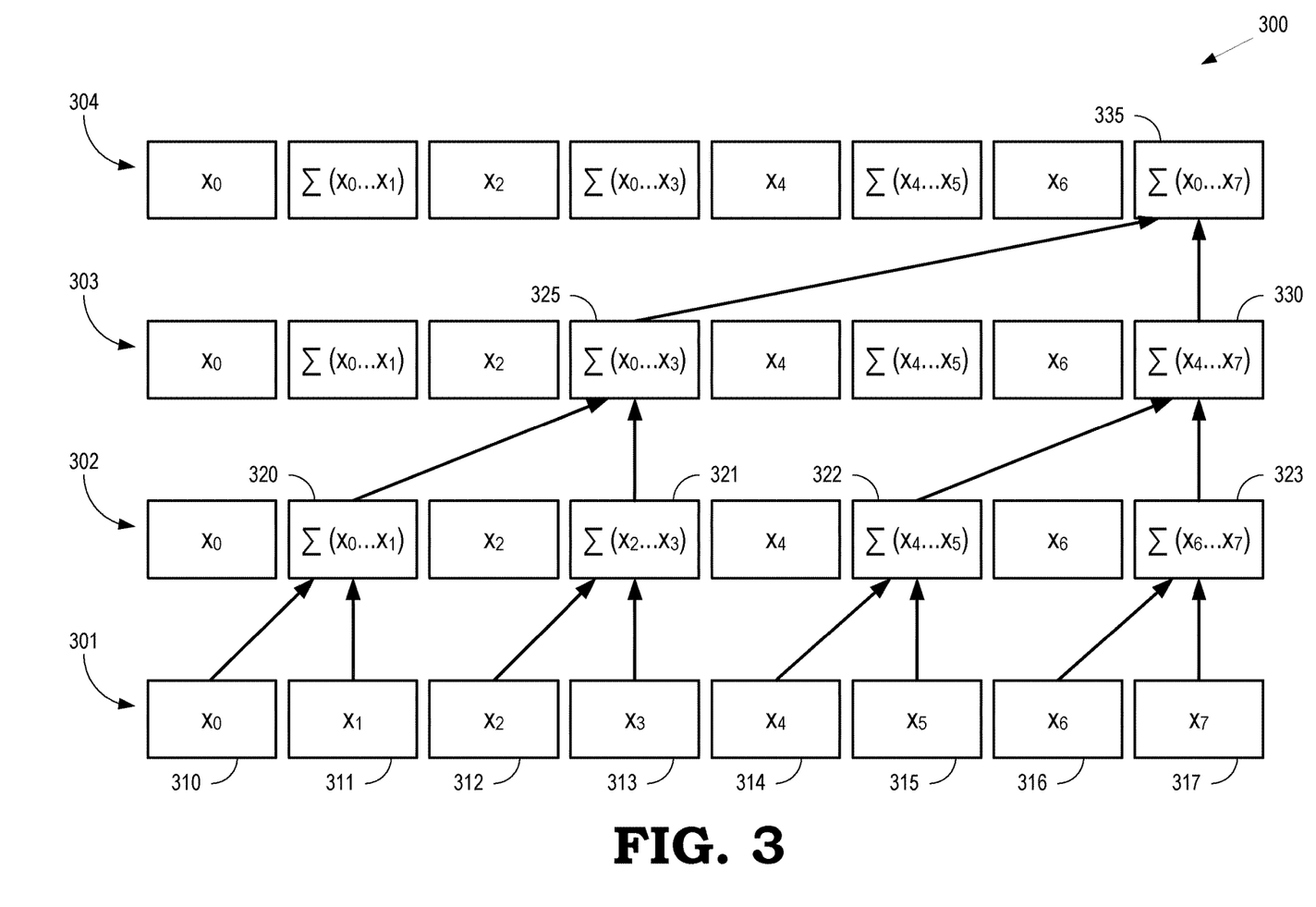
FIG. 3 is a block diagram of an upsweep tree that is used to perform reduction or scan operations according to some embodiments.

FIG. 3 is a block diagram of an upsweep tree 300 that is used to perform reduction or scan operations according to some embodiments. The operations indicated by the upsweep tree 300 are performed by some embodiments of the compute units 151-153 shown in FIG. 1 and the compute unit 200 shown in FIG. 2. The operations are performed on an ordered set of elements $[x_0, x_1, x_2, x_3, x_4, x_5, x_6, x_7]$ and the upsweep tree 300 includes four levels 301, 302, 303, 304, which are collectively referred to herein as "the levels 301-304."

The level 301 of the upsweep tree 300 includes the ordered set of elements in the entries 310, 311, 312, 313, 314, 315, 316, 317, which are collectively referred to herein as "the entries 310-317." The upsweep tree 300 defines the application of a binary associative operation $\oplus$ to pairs of elements associated with the ordered set of elements. At level 301, the upsweep tree 300 indicates that the binary associative operation $\oplus$ is applied to pairs of the ordered set of elements to generate values in the level 302. For example, the upsweep tree 300 defines the combinations:

$$\Sigma(x_0 \ldots x_1) = x_0 \oplus x_1$$

$$\Sigma(x_2 \ldots x_3) = x_2 \oplus x_3$$

$$\Sigma(x_4 \ldots x_5) = x_4 \oplus x_5$$

$$\Sigma(x_6 \ldots x_7) = x_6 \oplus x_7$$

These combinations are stored in the entries 320, 321, 322, 323 (collectively referred to herein as "the entries 320-323") in the level 302.

The upsweep tree 300 also defines how the binary associative operation $\oplus$ is applied to the level 302 pairs of elements associated with the ordered set of elements. For example, the upsweep tree 300 defines the combinations:

$$\Sigma(x_0 \ldots x_3) = \Sigma(x_0 \ldots x_1) \oplus \Sigma(x_2 \ldots x_3)$$

$$\Sigma(x_4 \ldots x_7) = \Sigma(x_4 \ldots x_5) \oplus \Sigma(x_6 \ldots x_7)$$

These combinations are stored in the entries 325, 330 in level 303 of the upsweep tree 300. The upsweep tree 300 further defines how the binary associative operation $\oplus$ is applied to the level 303 pairs of elements associated with the ordered set of elements. For example, the upsweep tree 300 defines the combination:

$$\Sigma(x_0 \ldots x_7) = \Sigma(x_0 \ldots x_3) \oplus \Sigma(x_4 \ldots x_7)$$

This combination is stored in the entry 335, which represents the result of a reduction operation performed on the ordered set of elements.

Figure 4:
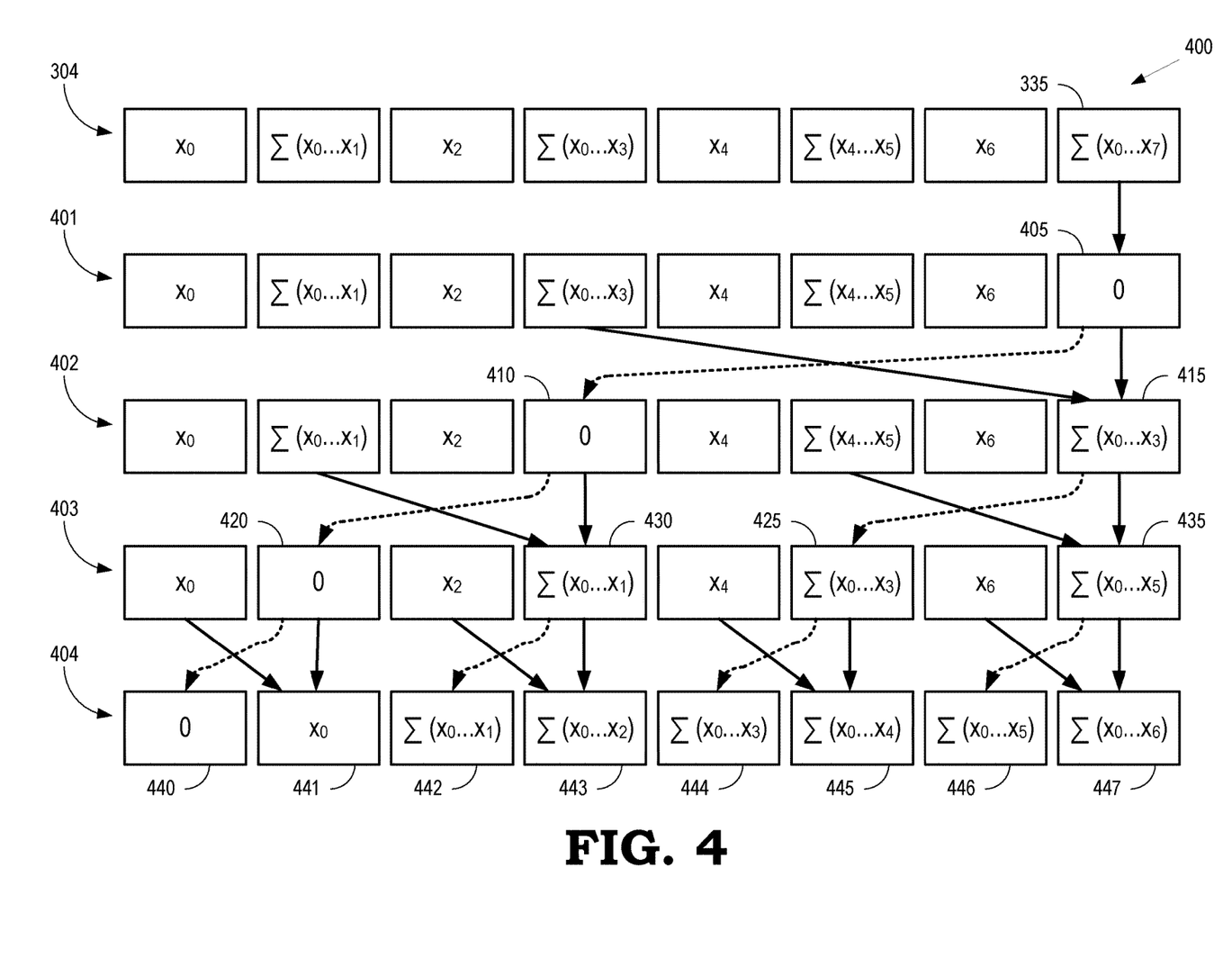
FIG. 4 is a block diagram of a downsweep tree that is used to perform scan operations according to some embodiments.

FIG. 4 is a block diagram of a downsweep tree 400 that is used to perform scan operations according to some embodiments. The operations indicated by the downsweep tree 400 are performed by some embodiments of the compute units 151-153 shown in FIG. 1 and the compute unit 200 shown in FIG. 2. The operations are performed on an ordered set of elements [$x_0$, $x_1$, $x_2$, $x_3$, $x_4$, $x_5$, $x_6$, $x_7$] and the downsweep tree 400 includes four levels 401, 402, 403, 404, which are collectively referred to herein as "the levels 401-404." Entries in the first level 401 correspond to the entries in the level 304 of the upsweep tree 300 shown in FIG. 3, except that the value in the entry 335 is set equal to zero to form the entry 405 in the level 401. In the illustrated embodiment, the downsweep tree 400 is used to compute an exclusive scan operation. The downsweep tree 400 is modified in some embodiments to perform an inclusive scan operation.

The downsweep tree 400 indicates how entries in the level 401 are combined or rearranged to form entries in the level 402. A copy of the value in the entry 405 is moved to entry 410 in the level 402. The downsweep tree 400 further defines how the binary associative operation $\oplus$ is applied to the level 401 pairs of elements associated with the ordered set of elements. For example, the downsweep tree 400 defines the combination:

$$\Sigma(x_0 \ldots x_3)=\Sigma(x_0 \ldots x_3) \oplus 0$$

This combination is stored in the entry 415 of the level 402.

The downsweep tree 400 also indicates how entries in the level 402 are combined or rearranged to form entries in the level 403. Copies of the values in the entries 410, 415 are moved to the entries 420, 425, respectively, in the level 403. The downsweep tree 400 further defines how the binary associative operation $\oplus$ is applied to the level 402 pairs of elements associated with the ordered set of elements. For example, the downsweep tree 400 defines the combinations:

$$\Sigma(x_0 \ldots x_1)=\Sigma((x_0 \ldots x_1) \oplus 0$$

$$\Sigma(x_0 \ldots x_5)=\Sigma(x_4 \ldots x_5) \oplus \Sigma(x_0 \ldots x_3)$$

These combinations are stored in the entries 430, 435, respectively, of the level 403.

The level 404 includes the entries 440, 441, 442, 443, 444, 445, 446, 447, which are collectively referred to herein as "the entries 440-447." The downsweep tree 400 indicates how the entries 440-447 in the level 404 are populated by moving and combining entries in the level 403. Copies of the values in the entries 420, 430, 425, 435 are moved to the entries 440, 442, 444, 446, respectively, in the level 404. The downsweep tree 400 further defines how the binary associative operation $\oplus$ is applied to the level 403 pairs of elements associated with the ordered set of elements. For example, the downsweep tree 400 defines the combinations:

$$x_0 = x_0 \oplus 0$$

$$\Sigma(x_0 \ldots x_2)=x_2 \oplus \Sigma(x_0 \ldots x_1)$$

$$\Sigma(x_0 \ldots x_4)=x_4 \oplus \Sigma(x_0 \ldots x_3)$$

$$\Sigma(x_0 \ldots x_6)=x_6 \oplus \Sigma(x_0 \ldots x_5)$$

These combinations are stored in the entries 441, 443, 445, 447, respectively, of the level 404. The entries 440-447 represent a vector result of a scan operation performed on the ordered set of elements [$x_0$, $x_1$, $x_2$, $x_3$, $x_4$, $x_5$, $x_6$, $x_7$].

Figure 5:
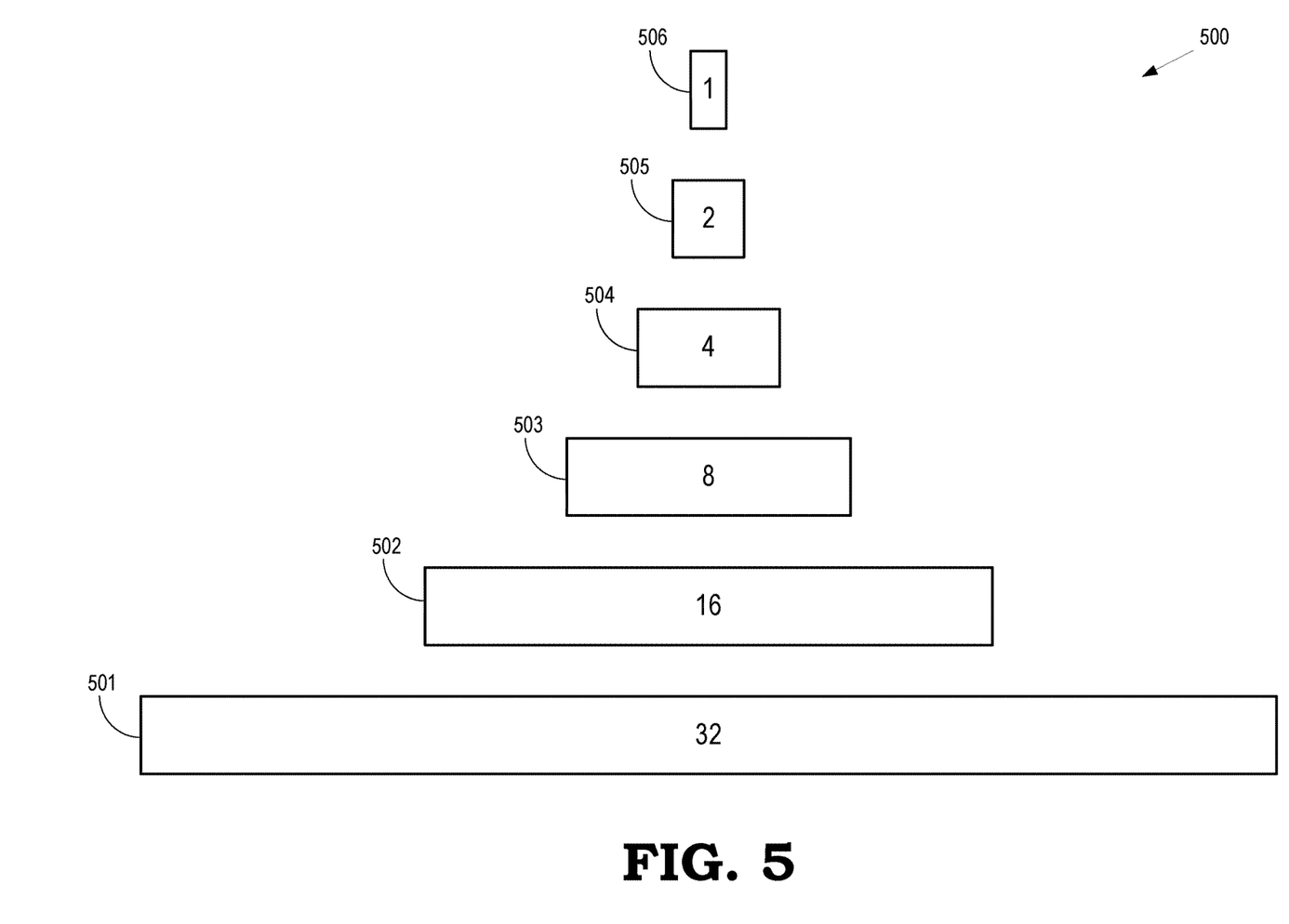
FIG. 5 is a block diagram of a hierarchy indicating a number of binary associative operations performed at different levels of an upsweep tree according to some embodiments.

FIG. 5 is a block diagram of a hierarchy 500 indicating a number of binary associative operations performed at different levels of an upsweep tree according to some embodiments.

In the illustrated embodiment, the upsweep tree is defined for an ordered set of elements including 64 elements. The upsweep tree therefore includes six levels 501, 502, 503, 504, 505, 506, which are collectively referred to herein as "the levels 501-506." Level 501 includes 32 binary associative operations that are performed on pairs of the 64 elements in the ordered set of elements. Level 502 includes 16 binary associative operations that are performed on pairs of elements in the level 501, which are generated based on the original ordered set of elements, as discussed herein. Level 503 includes eight binary associative operations that are performed on pairs of elements in level 502, which are associated with the original ordered set of elements. Level 504 includes four binary associative operations that are performed on pairs of elements in level 503, which are associated with the original ordered set of elements. Level 505 includes two binary associative operations that are performed on pairs of elements in level 504, which are associated with the original ordered set of elements. Level 506 includes a binary associative operation that is performed on a pair of elements in level 505, which is associated with the original ordered set of elements.

The number of binary associative operations performed at the levels 501-506 indicate a number of lanes in a compute unit, such as the compute unit 200 shown in FIG. 2, which are active during computation of the results of traversing the upsweep tree, e.g., while performing a reduction or scan operation. The binary associative operations for the levels 501-506 are performed sequentially so that the operations performed at lower levels are completed before the operations are performed for the higher levels. Thus, a large number of lanes in the compute unit remain inactive while other lanes are performing the binary associative operations for the levels 501-506. Performance of the compute unit is therefore enhanced by pipelining traversal of upsweep trees used to perform reduction or scan operations on multiple ordered sets of elements, as discussed herein.

Figure 6:
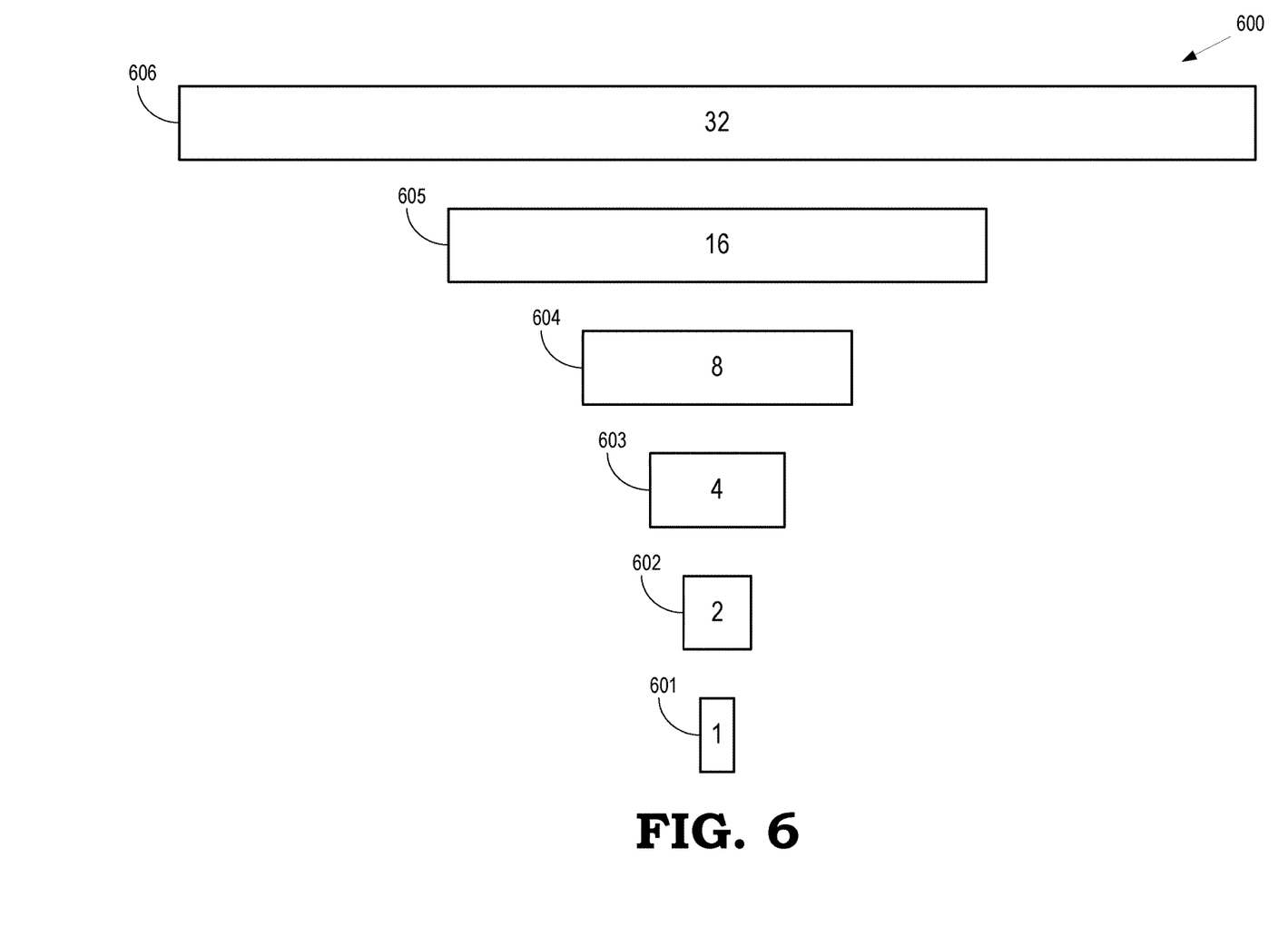
FIG. 6 is a block diagram of a hierarchy indicating a number of binary associative operations performed at different levels of a downsweep tree according to some embodiments.

FIG. 6 is a block diagram of a hierarchy 600 indicating a number of binary associative operations performed at different levels of a downsweep tree according to some embodiments. As discussed herein, traversal of the downsweep tree includes copying elements from higher levels to entries in lower levels as well as combining entries from the higher levels to generate entries in the lower levels using the binary associative operation.

In the illustrated embodiment, the downsweep tree is defined for an ordered set of elements including 64 elements. The downsweep tree therefore includes six levels 601, 602, 603, 604, 605, 606, which are collectively referred to herein as "the levels 601-606." Level 601 includes one binary associative operation that is performed on a pair of elements generated by a traversing an upsweep tree associated with the ordered set of elements. Level 602 includes two binary associative operations that are performed on pairs of elements in the level 601, which are generated based on the original ordered set of elements, as discussed herein. Level 603 includes four binary associative operations that are performed on pairs of elements in level 602, which are associated with the original ordered set of elements. Level 604 includes eight binary associative operations that are performed on pairs of elements in level 603, which are associated with the original ordered set of elements. Level 605 includes sixteen binary associative operations that are performed on pairs of elements in level 604, which are associated with the original ordered set of elements. Level 606 includes 32 binary associative operations that are performed on pairs of elements in level 605, which are associated with the original ordered set of elements.

The number of binary associative operations performed at the levels 601-606 indicate a number of lanes in a compute unit, such as the compute unit 200 shown in FIG. 2, which are active during computation of the results of traversing the downsweep tree, e.g., while performing a scan operation. The binary associative operations for the levels 601-606 are performed sequentially so that the operations performed at lower levels are completed before the operations are performed for the higher levels. Thus, a large number of lanes in the compute unit remain inactive while other lanes are performing the binary associative operations for the levels 601-606. Performance of the compute unit is therefore enhanced by pipelining traversal of downsweep trees used to perform scan operations on multiple ordered sets of elements, as discussed herein.

Figure 7:
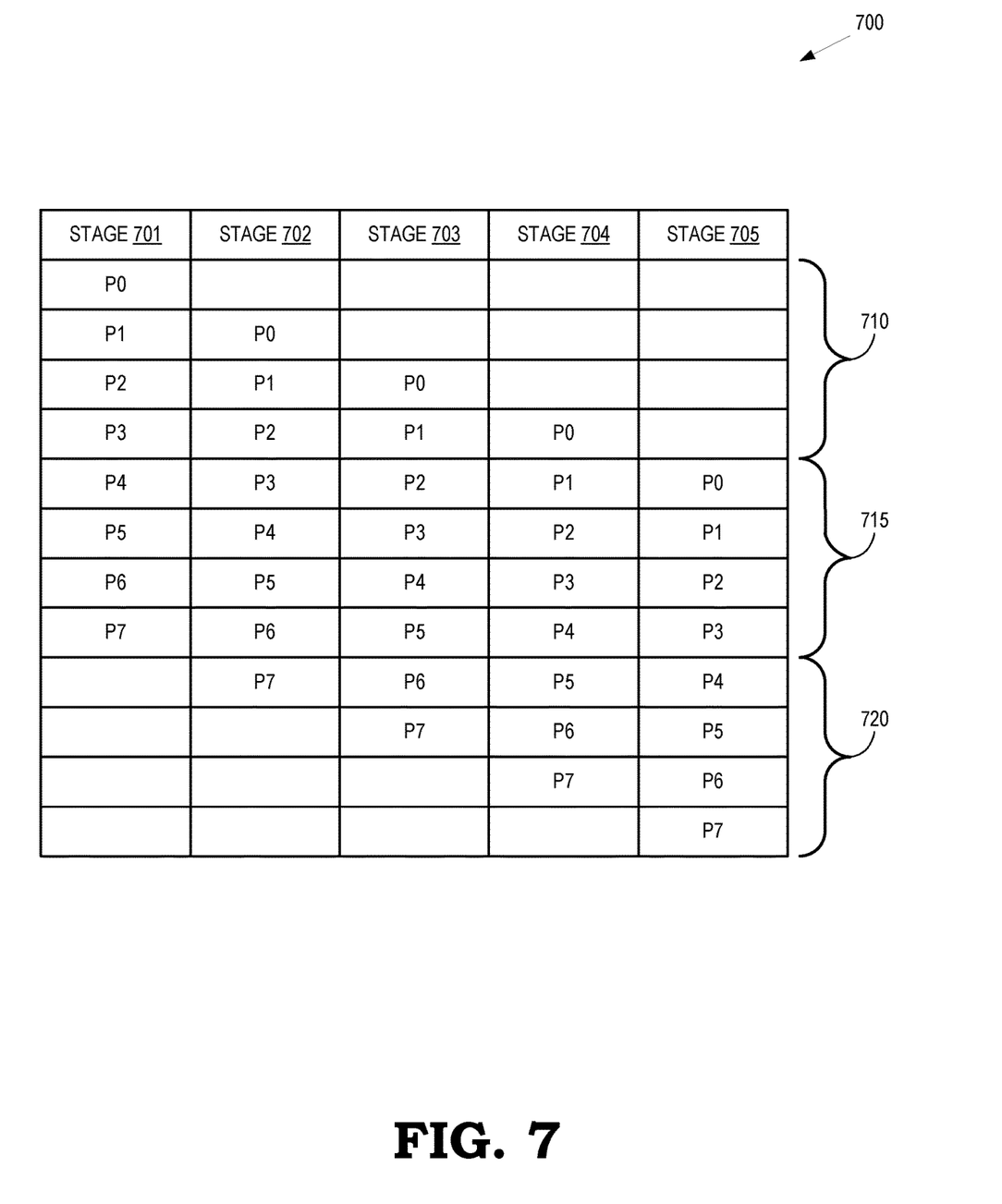
FIG. 7 is a block diagram of a pipeline for traversing upsweep and downsweep trees for reductions and scan operations according to some embodiments.

FIG. 7 is a block diagram of a pipeline 700 for traversing upsweep and downsweep trees for reductions and scan operations according to some embodiments. Time increases from top to bottom in FIG. 7. The pipeline 700 is implemented in some embodiments of the compute units 151-153 shown in FIG. 1 and the compute unit 200 shown in FIG. 2. The pipeline 700 includes the stages 701, 702, 703, 704, 705, which are collectively referred to herein as "the stages 701-705." In the illustrated embodiment, the pipeline 700 is used to compute a reduction using addition as the binary associative operation. The pipeline 700 therefore performs a prefix sum by traversing an upsweep tree. However, some embodiments of the pipeline 700 perform scan operations by first traversing an upsweep tree and subsequently traversing a downsweep tree.

The pipeline 700 performs the prefix sum on multiple ordered sets of elements: P0, P1, P2, P3, P4, P5, P6, P7. During a first time interval or iteration, the ordered set of elements P0 is provided to the stage 701 and the pipeline 700 performs the addition operations (or other binary associative operations in some embodiments) on pairs of the ordered set of elements P0, as indicated by the upsweep tree. At the completion of the first iteration, the results of the stage 701 are provided to a subsequent stage 702, e.g., via lane interchange circuitry, as discussed herein. During a second iteration, the ordered set of elements P1 is provided to the stage 701, which performs the addition operations on pairs of the ordered set of elements P1, as indicated by the upsweep tree. The stage 702 performs the addition operations on pairs of the results associated with the ordered set of elements P0. At the completion of the second iteration, results of the stage 701 are provided to the stage 702 and results of the stage 702 are provided to the stage 703. The process continues through subsequent iterations.

The iterations performed by the stages 701-705 are subdivided into a pipeline filling interval 710, a pipeline steady-state interval 715, and a pipeline draining interval 720. The occupancy of the stages 701-705 is less than the maximum occupancy while the pipeline 700 fills up with operations performed on the ordered sets of elements P0-P5 during the pipeline filling interval 710. The occupancy of the stages 701-705 is at a maximum occupancy while the pipeline 700 is in the pipeline steady-state interval 715. The occupancy of the stages 701-705 declines from the maximum occupancy as operations are completed on the ordered sets of elements P2-P7 and the pipeline 700 drains during the pipeline draining interval 720.

The stages 701-705 of the pipeline 700 occupy different numbers of SIMD lanes. During the pipeline steady-state interval 715, the occupancy or SIMD lane utilization of a pipeline at stage i is equal to $(1/(2^{i+1}))$ for an upsweep tree and $(1/(2^{P-i-1}))$, where P is the number of pipeline stages 701-705. In the pipeline steady-state interval 715, the number of copies of each stage 701-705 is equal to the number N of prefix sums that are being calculated. A sum over the utilizations of the stages 701-705 is:

$$\frac{2^P - 1}{2^P}$$

If N copies are executing, the combined utilization over N cycles is:

$$N \cdot \frac{2^P - 1}{2^P}$$

Assuming complete utilization, the total feasible amount of work is N+P−1, as it takes that many time steps to push N upsweeps through the pipeline. Thus, the SIMD utilization as a whole is:

$$\left(N \cdot \frac{2^P - 1}{2^P}\right) / (N + P - 1)$$

Thus, as N→∞, utilization of the SIMD lanes approaches 100% and the pipelined implementation should approach being P times faster than the non-pipelined baseline. Unutilized SIMD lanes are masked to indicate that they are not executing operations of the upsweep or downsweep tree.

Figure 8:
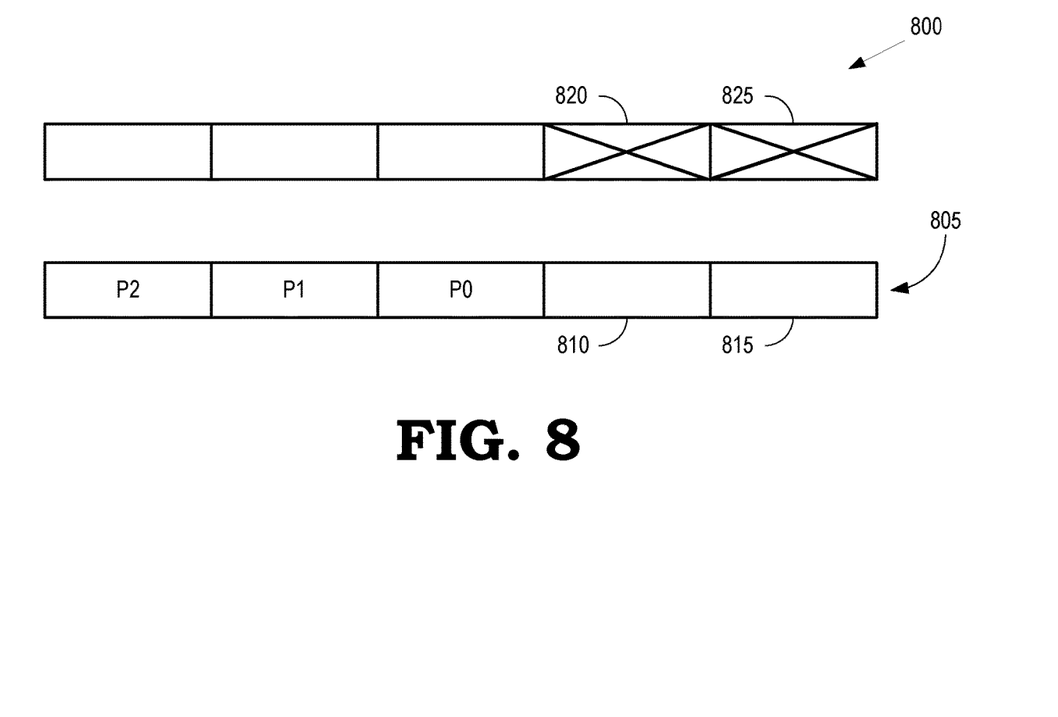
FIG. 8 is a block diagram of a mask that indicates unused pipeline stages during pipeline filling according to some embodiments.

FIG. 8 is a block diagram of a mask 800 that indicates unused pipeline stages during pipeline filling according to some embodiments. The mask 800 is used to mask unused pipeline stages in some embodiments of the pipeline filling interval 710 shown in FIG. 1. For example, the mask 800 corresponds to an iteration following insertion of the ordered set of elements P2 into the pipeline 700 shown in FIG. 7. At this iteration, the stages 810, 815 are not occupied. The mask 800 therefore indicates the unused stages 810, 815 using the crossed boxes 820, 825, respectively. In some embodiments, the mask 800 is represented by setting or unsetting bits in a register associated with the pipeline.

Figure 9:
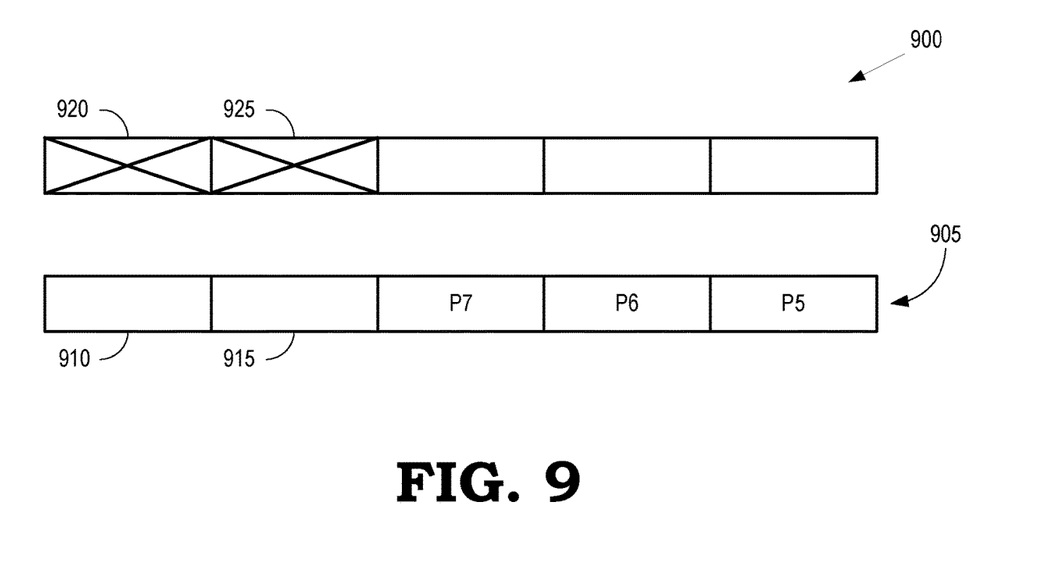
FIG. 9 is a block diagram of a mask that indicates unused pipeline stages during pipeline draining according to some embodiments.

FIG. 9 is a block diagram of a mask 900 that indicates unused pipeline stages during pipeline draining according to some embodiments. The mask 900 is used to mask unused pipeline stages in some embodiments of the pipeline draining interval 720 shown in FIG. 1. For example, the mask 900 corresponds to an iteration following completion of the ordered set of elements P4 and exit of the ordered set of elements P4 from the pipeline 700 shown in FIG. 7. At this iteration, the stages 910, 915 are not occupied. The mask 900 therefore indicates the unused stages 910, 915 using the crossed boxes 920, 925, respectively. In some embodiments, the mask 900 is represented by setting or unsetting bits in a register associated with the pipeline.

Figure 10:
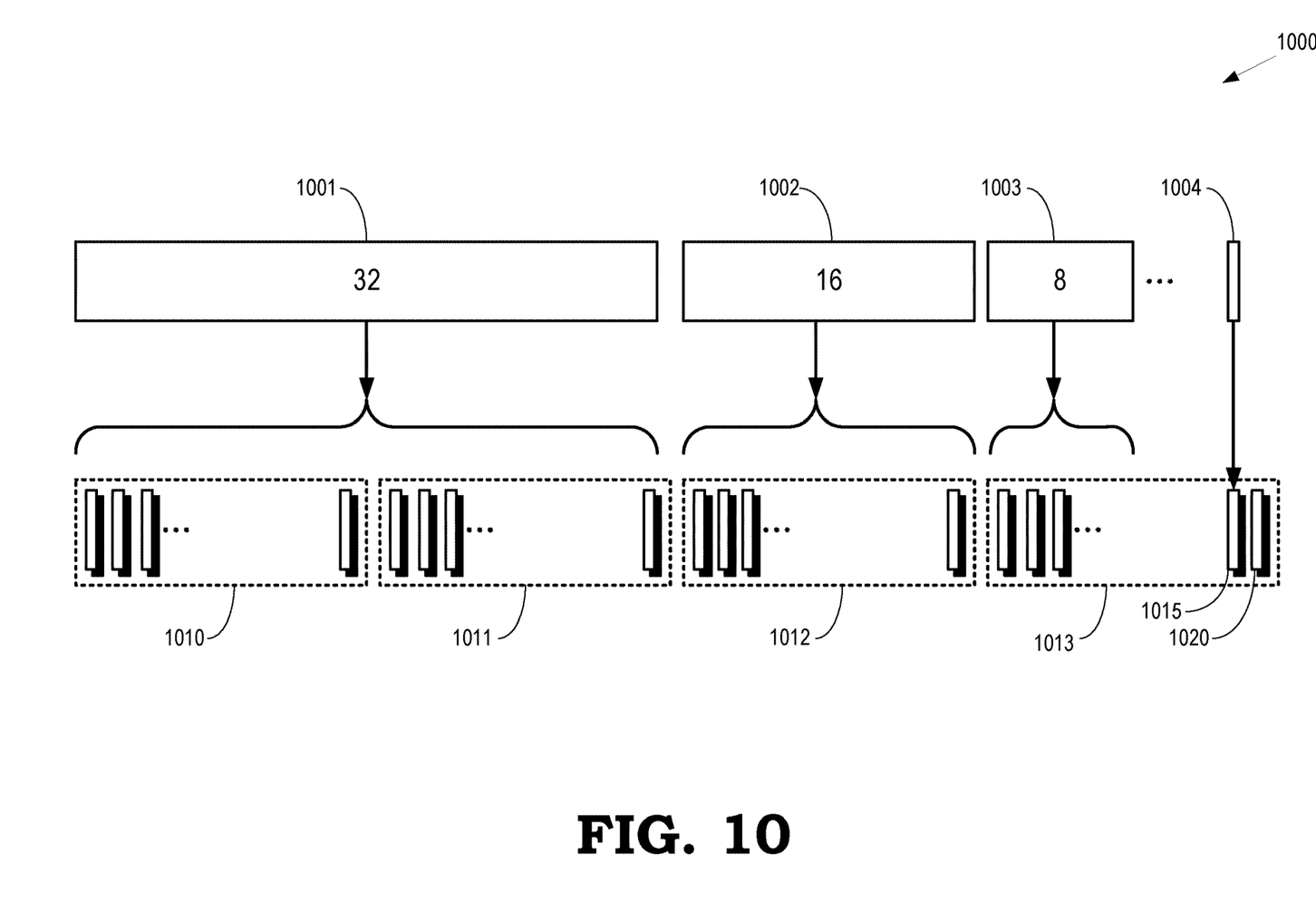
FIG. 10 is a block diagram of a mapping of pipeline stages to single-instruction-multiple-data (SIMD) lanes according to some embodiments.

FIG. 10 is a block diagram of a mapping 1000 of pipeline stages to SIMD lanes according to some embodiments. The mapping 1000 is used to implement a pipeline in some embodiments of the compute unit 200 shown in FIG. 2. In the illustrated embodiment, pipeline stages 1001, 1002, 1003, 1004, collectively referred to herein as "the pipeline stages 1001-1004," are mapped to subsets of SIMD lanes that are grouped into SIMD sets 1010, 1011, 1012, 1013, which are collectively referred to herein as "the SIMD sets 1010-1013." For example, the pipeline stage 1001 performs 32 binary associative operations on corresponding pairs of elements in an ordered set of elements. The pipeline stage 1001 is therefore mapped to the sixteen SIMD lanes in the SIMD sets 1010, 1011. The pipeline stage 1002 performs sixteen binary associative operations on corresponding pairs of elements associated with an ordered set of elements. The pipeline stage 1002 is therefore mapped to the sixteen SIMD lanes in the SIMD sets 1012. The pipeline stage 1003 performs eight binary associative operations on corresponding pairs of elements associated with an ordered set of elements. The pipeline stage 1003 is therefore mapped to eight of the SIMD lanes in the SIMD set 1013. The final pipeline stage 1004 is mapped to the SIMD lane 1015 in the SIMD set 1013. The SIMD lane 1020 is unused and remains masked or, in some embodiments, the SIMD lane 1020 is used to stage complete and/or partial results or to pass in results from other scans or reductions. In other embodiments, a 64-wide instruction is scheduled for execution on a 16-wide SIMD and the 64-wide instruction is executed over four cycles (in the best case), with each cycle consuming one quarter of the work (i.e., the work from 16 work items).

Figure 11:
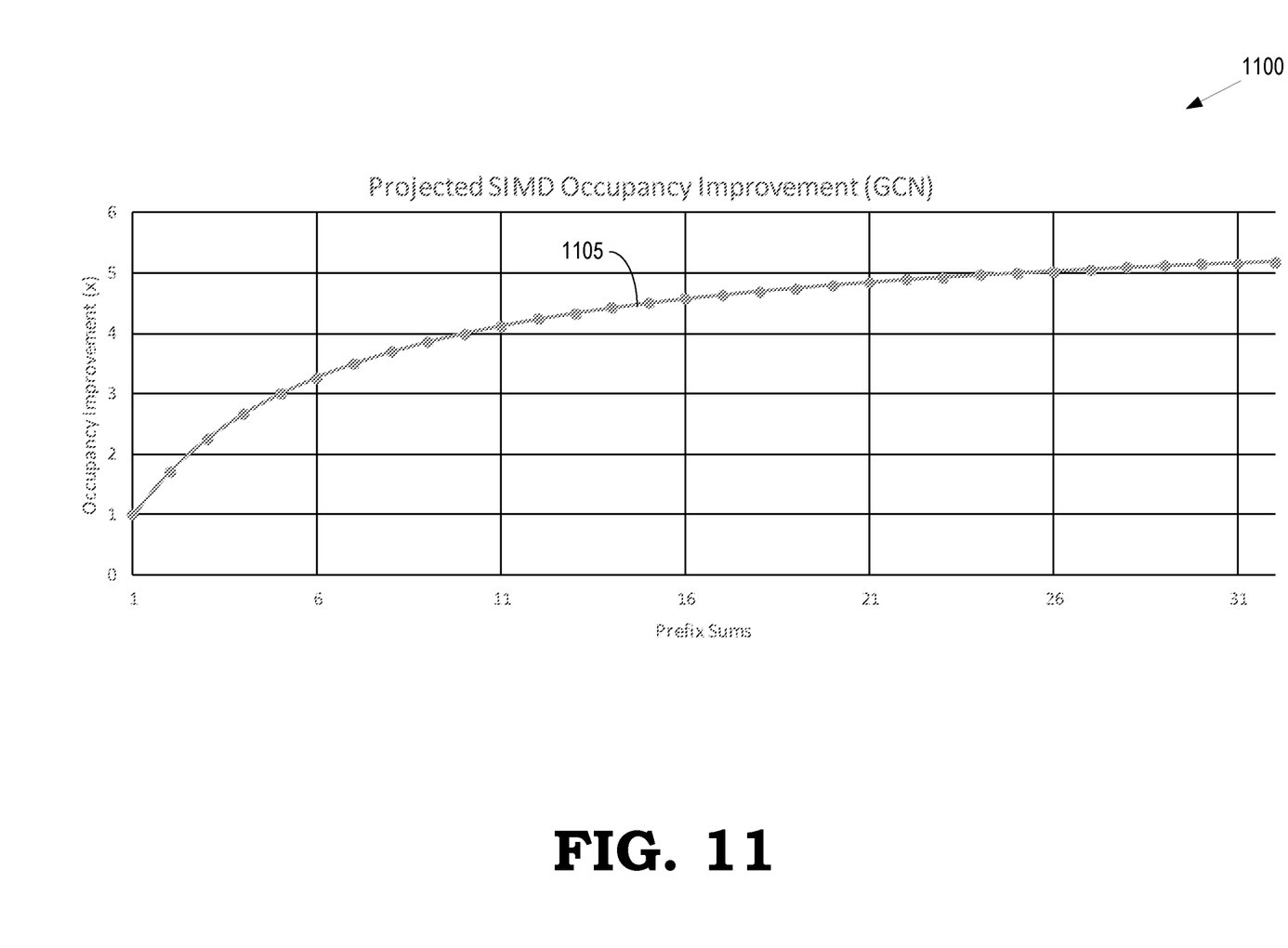
FIG. 11 is a plot illustrating a projected improvement in the occupancy of SIMD lanes achieved by pipelining upsweep or downsweep tree traversals according to some embodiments.

FIG. 11 is a plot 1100 illustrating a projected improvement in the occupancy of SIMD lanes achieved by pipelining upsweep or downsweep tree traversals according to some embodiments. The curve 1105 illustrates the improvement in occupancy as the number of prefix sums in the pipeline is increased for ordered sets that include 64 elements and a compute unit that includes 64 SIMD lanes. Increasing the number of prefix sums in the pipeline amortizes the overhead associated with implementing the pipeline, e.g., the costs of pipeline filling and pipeline draining. The curve 1105 illustrates that the improvement in occupancy asymptotically approaches a factor of six or $\log_2(64)$.

Figure 12:
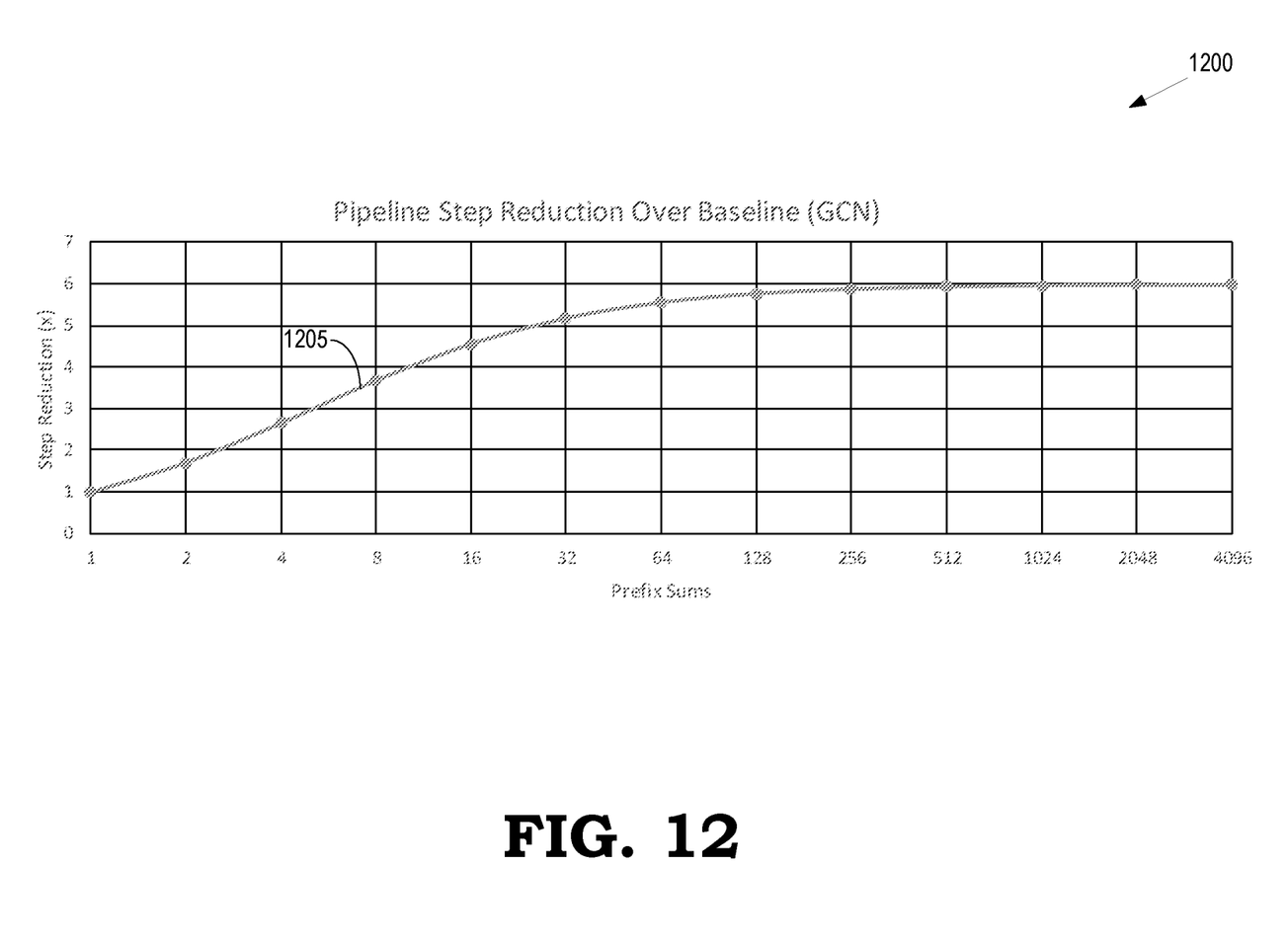
FIG. 12 is a plot illustrating a pipeline step reduction achieved by pipelining upsweep or downsweep tree traversals, relative to a non-pipelined baseline implementation, according to some embodiments.

FIG. 12 is a plot 1200 illustrating a pipeline step reduction achieved by pipelining upsweep or downsweep tree traversals, relative to a non-pipelined baseline implementation, according to some embodiments. The curve 1205 illustrates the increase in the pipeline step reduction as the number of prefix sums in the pipeline is increased for ordered sets that include 64 elements and a compute unit that includes 64 SIMD lanes. Increasing the number of prefix sums in the pipeline amortizes the overhead associated with implementing the pipeline, e.g., the costs of pipeline filling and pipeline draining. The curve 1105 illustrates that the pipeline step reduction asymptotically approaches a factor of six or $\log_2(64)$.

A computer readable storage medium includes any non-transitory storage medium, or combination of non-transitory storage media, accessible by a computer system during use to provide instructions and/or data to the computer system. Such storage media includes, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium can be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium includes, for example, a magnetic or optical disk storage device, solid state storage devices such as Flash memory, a cache, random access memory (RAM) or other non-volatile memory device or devices, and the like. The executable instructions stored on the non-transitory computer readable storage medium are in source code, assembly language code, object code, or other instruction format that is interpreted or otherwise executable by one or more processors.

Note that not all of the activities or elements described above in the general description are required, that a portion of a specific activity or device may not be required, and that one or more further activities can be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that could any benefit, advantage, or solution to occur or become more pronounced are not to be construed as a critical, required, or essential feature of any or all the claims. Moreover, the particular embodiments disclosed above are illustrative only, as the disclosed subject matter can be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above can be altered or modified and all such variations are considered within the scope of the disclosed subject matter. Accordingly, the protection sought herein is as set forth in the claims below.

What is claimed is:

1. An apparatus comprising:
  a compute unit comprising a plurality of single-instruction-multiple-data (SIMD) lanes that implement a pipeline; and
  a scheduler configured to schedule the plurality of SIMD lanes to apply a binary associative operation to pairs of elements associated with a plurality of ordered sets of elements, wherein subsets of the plurality of SIMD lanes concurrently apply the binary associative operation to pairs of elements at different levels of upsweep trees associated with the plurality of ordered sets of elements.

2. The apparatus of claim 1, wherein:
the subsets of the plurality of SIMD lanes implement stages of the pipeline,
a number of stages in the pipeline is determined by a number of levels in the upsweep trees, and
each pipeline stage is associated with a different level of the upsweep trees.

3. The apparatus of claim 2, wherein the stages of the pipeline concurrently apply the binary associative operation to the pairs of elements associated with the ordered sets of elements at different levels of the upsweep tree during a first iteration of the pipeline.

4. The apparatus of claim 3, further comprising:
lane exchange circuitry configured to provide, in response to completing the first iteration, results of the binary associative operations performed by the stages to stages associated with next higher levels of the upsweep tree for use in a subsequent second iteration of the pipeline.

5. The apparatus of claim 4, wherein the lane exchange circuitry comprises at least one of:
a cache,
a scratch pad implemented in high-bandwidth/low-latency memory, and
lane interchange circuitry implemented using at least one vector register and at least one vector load/store instruction.

6. The apparatus of claim 4, wherein results of the binary associative operation performed in a last pipeline stage are written to at least one of a register, a buffer, or a memory.

7. The apparatus of claim 4, wherein the pipeline is configured to perform a reduction operation that produces a scalar result equal to an application of the binary associative operation to the elements in one of the plurality of ordered sets of elements.

8. The apparatus of claim 4, wherein the pipeline is configured to perform a scan operation that produces a vector result indicating a sequence of values produced by applying the binary associative operation to previous elements, relative to the position of the value in the vector result, in one of the plurality of ordered sets of elements.

9. The apparatus of claim 8, wherein the scheduler is configured to schedule the plurality of SIMD lanes to concurrently apply the binary associative operation to pairs of elements at different levels of downsweep trees associated with the plurality of ordered sets of elements subsequent to applying the binary associative operation to the pairs of elements at different levels of the upsweep trees associated with the plurality of ordered sets of elements.

10. A method comprising:
scheduling a plurality of single-instruction-multiple-data (SIMD) lanes of a processor to apply a binary associative operation to pairs of elements associated with a plurality of ordered sets of elements; and
concurrently applying the binary associative operation to pairs of elements at different levels of upsweep trees associated with the plurality of ordered sets of elements using subsets of the plurality of SIMD lanes.

11. The method of claim 10, wherein:
the subsets of the plurality of SIMD lanes implement stages of a pipeline of the processor,
a number of stages in the pipeline is determined by a number of levels in the upsweep trees, and
each pipeline stage is associated with a different level of the upsweep trees.

12. The method of claim 11, wherein concurrently applying the binary associative operation comprises concurrently applying the binary associative operation to the pairs of elements associated with the ordered sets of elements at different levels of the upsweep tree using subsets of the plurality of SIMD lanes during a first iteration of the pipeline.

13. The method of claim 12, further comprising:
in response to completing the first iteration, providing results of the binary associative operations performed by the stages to stages associated with next higher levels of the upsweep tree for use in a subsequent second iteration of the pipeline.

14. The method of claim 12, further comprising:
writing results of the binary associative operation performed in a last pipeline stage to at least one of a register, a buffer, or a memory.

15. The method of claim 12, wherein concurrently applying the binary associative operation comprises performing a reduction operation that produces a scalar result equal to an application of the binary associative operation to the elements in one of the plurality of ordered sets of elements.

16. The method of claim 12, wherein concurrently applying the binary associative operation comprises performing a scan operation that produces a vector result indicating a sequence of values produced by applying the binary associative operation to previous elements, relative to the position of the value in the vector result, in one of the plurality of ordered sets of elements.

17. The method of claim 16, further comprising:
concurrently applying the binary associative operation to pairs of elements at different levels of downsweep trees associated with the plurality of ordered sets of elements using subsets of the plurality of SIMD lanes subsequent to applying the binary associative operation to the pairs of elements at different levels of the upsweep trees associated with the plurality of ordered sets of elements.

18. A method, comprising:
applying, using a pipeline implemented in a processor, a binary associative operation to first pairs of elements in a first level of a first upsweep tree for a first ordered set of elements; and
concurrently with applying the binary associative operation to the first pairs of elements, applying, using the pipeline the binary associative operation to second pairs of elements in a second level of a second upsweep tree for a second ordered set of elements, wherein the first level is different than the second level.

19. The method of claim 18, wherein the binary associative operation is concurrently applied to the first and second pairs of elements in the first and second levels of the first and second upsweep trees, respectively, by corresponding first and second subsets of a plurality of single-instruction-multiple-data (SIMD) lanes during a first time interval, and further comprising:
providing results of applying the binary associative operation to the first pair of elements from the first subset to the second subset of the plurality of SIMD lanes in response to completing the first time interval; and
applying the binary associative operation to pairs of the results concurrently with applying the binary associative operation to third pairs of elements in the first level of a third upsweep tree for a third ordered set of elements during a second time interval subsequent to the first time interval.

20. The method of claim 18, further comprising:

applying the binary associative operation to fourth pairs of elements in a first level of a first downsweep tree for the first ordered set of elements; and concurrently with applying the binary associative operation to the fourth pairs of elements, applying the binary associative operation to fifth pairs of elements in a second level of a second downsweep tree for the second ordered set of elements, wherein the first level is different than the second level.

* * * * *